(12) United States Patent
Kamiyama et al.

(10) Patent No.: US 8,635,753 B2
(45) Date of Patent: Jan. 28, 2014

(54) LATERAL PIPE LINING METHOD AND LATERAL PIPE LINING APPARATUS

(75) Inventors: Takao Kamiyama, Hiratsuka (JP); Koji Kaneta, Hiratsuka (JP); Kenji Fujii, Hiratsuka (JP); Fuminori Tanaka, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 390 days.

(21) Appl. No.: 13/199,496

(22) Filed: Aug. 31, 2011

(65) Prior Publication Data

US 2012/0060346 A1    Mar. 15, 2012

(30) Foreign Application Priority Data

Sep. 10, 2010  (JP) .................................. 2010-202647

(51) Int. Cl.
  *B23P 6/00* (2006.01)
  *F16L 55/18* (2006.01)

(52) U.S. Cl.
  USPC ......... 29/402.01; 29/402.09; 29/507; 29/523; 29/781; 29/819; 138/97; 138/98

(58) Field of Classification Search
  USPC .............. 29/402.01, 402.09, 507, 522.1, 523, 29/779, 781, 782, 819; 138/97, 98, 119, 138/153, 172
  See application file for complete search history.

(56) References Cited

U.S. PATENT DOCUMENTS

| | | | | |
|---|---|---|---|---|
| 4,982,490 A | * | 1/1991 | Franklin | 29/890.14 |
| 5,199,145 A | * | 4/1993 | McMillan et al. | 29/237 |
| 5,454,401 A | * | 10/1995 | Kamiyama et al. | 138/98 |
| 5,598,873 A | * | 2/1997 | Kamiyama et al. | 138/98 |
| 6,006,787 A | * | 12/1999 | Kamiyama et al. | 138/98 |
| 6,152,184 A | * | 11/2000 | Kamiyama et al. | 138/98 |
| 6,484,757 B1 | * | 11/2002 | Warren | 138/98 |
| 7,311,121 B2 | * | 12/2007 | Kamiyama et al. | 138/98 |
| 7,975,726 B2 | * | 7/2011 | Kiest, Jr. | 138/98 |
| 2003/0178078 A1 | * | 9/2003 | Warren | 138/98 |
| 2006/0130922 A1 | * | 6/2006 | Kamiyama et al. | 138/98 |
| 2008/0029177 A1 | * | 2/2008 | Kamiyama et al. | 138/98 |
| 2009/0056823 A1 | * | 3/2009 | Kiest, Jr. | 138/98 |
| 2010/0154187 A1 | * | 6/2010 | Kamiyama et al. | 29/402.16 |

* cited by examiner

*Primary Examiner* — Jermie Cozart
(74) *Attorney, Agent, or Firm* — Adams & Wilks

(57) ABSTRACT

A lateral pipe lining material having a flange on one end thereof is installed on a head collar which is hermetically mounted on a pressure bag that stores the lateral pipe lining material. The head collar comprises a curved section and a cylindrical section projecting from the curved section. An expandable member is mounted to the outer circumferential surface of the cylindrical section of the head collar, and expanded so that the outer circumferential surface of the expanding member comes into close contact with the inner circumferential surface near the flange, and the inner circumferential surface thereof comes into close contact with the outer circumferential surface of the cylindrical section of the head collar. This allows a hermetical connection between the lateral pipe lining material and the head collar and ensures a reliable eversion and insertion of the lining material into a lateral pipe.

16 Claims, 13 Drawing Sheets

LATERAL PIPE LINING METHOD AND LATERAL PIPE LINING APPARATUS

BACKGROUND OF THE INVENTION

1. Field of the Invention

The present invention relates to a lateral pipe lining method and a lateral pipe lining apparatus, and more particularly, to a lateral pipe lining method and a lateral pipe lining apparatus in which a flange formed on one end of a flexible tubular resin-absorbing material impregnated with a curable resin is brought into close contact with the periphery of a lateral pipe opening of a main pipe and eversion pressure is applied to the lateral pipe lining material to evert and insert the lateral pipe lining material into the lateral pipe in order to line the lateral pipe with the lining material.

2. Description of the Related Art

When pipelines such as sewer pipes buried underground have degraded, there is known a pipe lining method in which the pipeline has its inner surface lined and repaired without the pipeline being dug up from underground.

In this pipe lining method, a tubular lining material comprising a flexible tubular resin-absorbing material impregnated with a curable resin, the outer circumferential surface of which has been coated with a high-airtight film, is inserted into the pipeline while being everted using fluid pressure. The tubular lining material is pressed against the inner circumferential surface of the pipeline by fluid pressure, and is then heated to cure the curable resin impregnated in the material and line the inner circumferential surface of the pipeline.

Such a method can be applied even to the lining of a lateral pipe that branches from a main pipe. When lining the lateral pipe, a flange formed on one end of a tubular lateral pipe lining material that is housed in a pressure bag is positioned on the head collar of a work robot guided into the main pipe. The work robot is driven to bring the lateral pipe lining material so that the flange thereof comes into close contact with the periphery of the lateral pipe opening of the main pipe. When a pressurized fluid such as a compressed gas or a liquid under pressure is fed into the pressure bag, the lateral pipe lining material is subjected to this pressure, and is inserted into the lateral pipe while being everted. When the material is completely everted and inserted along the entire length of the lateral pipe, the lateral pipe lining material is pressed against the inner circumferential surface of the lateral pipe and heated to cure the thermosetting resin impregnated in the lining material. The inner circumferential surface of the lateral pipe is thus lined by the cured lateral pipe lining material.

Since the lateral pipe lining material is everted and inserted into the lateral pipe by feeding a pressurized fluid to the pressure bag, any leakage of the pressurized fluid may result in the pressure being inadequate, and the lateral pipe lining material becoming less readily everted and inserted. In particular, if the lateral pipe lining material is not reliably positioned in the pressure bag, the area at which the lateral pipe lining material is connected to the pressure bag will cease to be airtight, making it difficult to evert and insert the lateral pipe lining material.

To improve airtight connection between a pressure bag and a lateral pipe lining material, Japanese Laid-open Publication No. H04-355115 proposes that a removable tube that is shorter than the lateral pipe lining material and that can be removed therefrom is provided, and the one end of the removable tube is temporarily fixed near the flange of the lateral pipe lining material with the other end thereof being secured to the pressure bag. The lateral pipe lining material is reliably everted and inserted because pressurized fluid cannot leak outside from where the removable tube is temporarily fixed.

Japanese Laid-open Publication No. 2008-168468 discloses that a tubular sealing member comprising a metal or a hard plastic is integrated with the flange of the lateral pipe lining material, and an annular elastic body is mounted between this sealing member and a cylindrical member fixed to the head collar of the work robot. This elastic body produces an airtight seal between the periphery of the flange of the lateral pipe lining material and the pressure bag, allowing the lateral pipe lining material to be everted and inserted into the lateral pipe without pressurized fluid leaking out.

SUMMARY OF THE INVENTION

However, the configuration proposed in Japanese Laid-open Publication No. H04-355115 is disadvantageous because the removable tube must be temporarily fixed to the lateral pipe lining material and it raises the production cost of the lateral pipe lining material. This configuration also requires an operation to peel off the removable tube after the lateral pipe lining material has been everted and inserted into the lateral pipe, and presents a problem in that the inside of the lateral pipe lining material may get damaged as a result, reducing the quality of the lining.

The configuration disclosed in Japanese Laid-open Publication No. 2008-168468 does not require a removable tube, but is problematic in that a tubular sealing member comprising a metal or a hard plastic must be integrally provided to the flange of the lateral pipe lining material, which increases the production cost of the lateral pipe lining material.

An object of the present invention is to provide a lateral pipe lining method and a lateral pipe lining apparatus capable of improving the airtight connection between a lateral pipe lining material and a pressure bag or a head collar that is secured in an airtight manner to the pressure bag, and reliably everting and inserting the lateral pipe lining material into the lateral pipe to thereby line the lateral pipe with the lining material at a high quality.

In the present invention, a flange formed on one end of a lateral pipe lining material composed of a flexible tubular resin-absorbing material impregnated with a curable resin is brought into close contact with the periphery of a lateral pipe opening of a main pipe, and eversion pressure is applied to the lateral pipe lining material to evert and insert the lateral pipe lining material into a lateral pipe to line the inner circumferential wall thereof. A head collar is prepared which has a curved section and a cylindrical section projecting from the curved section and having a smaller outside diameter than the inside diameter of the flange of the lateral pipe lining material. The head collar is airtightly connected to a pressure bag that stores the lining material. An annular expanding member capable of expanding by feeding a pressurized fluid thereto is mounted to the outer circumferential surface of the cylindrical section of the head collar. The lateral pipe lining material is installed on the head collar so that the cylindrical section of the head collar to which the expanding member is mounted is located within the flange of the lateral pipe lining material. The expanding member is expanded so that the outer circumferential surface of the expanding member comes into close contact with the inner circumferential surface of the flange and the inner circumferential surface thereof comes into close contact with the outer circumferential surface of the cylindrical section of the head collar. The lateral pipe lining material is everted and inserted into the lateral pipe with the expanding member expanded to line the lateral pipe with the lateral pipe lining material.

With such an arrangement in the present invention, a hermetical connection is established between the lateral pipe lining material and the head collar when the expanding member is expanded. This prevents any leakage of a pressurized fluid for everting and inserting the lateral pipe lining material from the area where the lateral pipe lining material is connected to the head collar, ensuring that the lateral pipe lining material can reliably be everted and inserted into the lateral pipe.

Further features of the invention, its nature and various advantages will be more apparent from the accompanying drawings and following detailed description of the invention.

DESCRIPTION OF THE PREFERRED EMBODIMENTS

Figure 1:
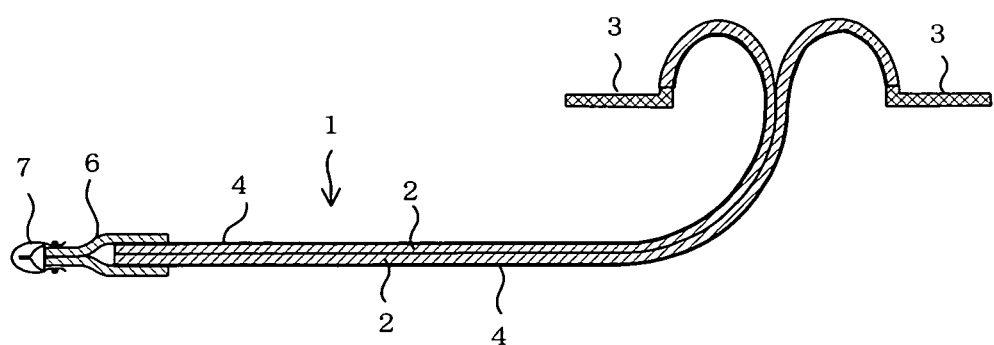
FIG. 1 is a sectional view of a lateral pipe lining material used in the method of the present invention.

The present invention will be described in detail hereinafter on the basis of embodiments shown in the drawings.

FIG. 1 shows a lateral pipe lining material 1 for lining a lateral pipe. The lateral pipe lining material 1 is composed of a flexible tubular resin-absorbing material 2, one end of which is bent back outward into a collar-shaped flange 3. The portion of the tubular resin-absorbing material 2 except for the flange 3 is impregnated with an uncured liquid thermosetting resin, and the outer circumferential surface of this portion (which becomes the inner circumferential surface after eversion) is coated with a highly airtight plastic film 4 made of polyethylene, polypropylene, Nylon, vinyl chloride, or another material.

The tubular resin-absorbing material 2 comprises an unwoven cloth, a woven cloth, or a mat using a plastic fiber made of polyamide, polyester, polypropylene, or the like; a woven cloth or a mat using a glass fiber; or an unwoven cloth, a woven cloth, or a mat combining the plastic fiber and the glass fiber. The thermosetting resin with which the tubular resin-absorbing material 2 has been impregnated may be, for example, an unsaturated polyester resin, a vinyl ester resin, or an epoxy resin.

The flange 3 formed on one end of the tubular resin-absorbing material 2 has a curved surface curving in an arc corresponding to the curvature of the inner wall of a main pipe 30 to be described later (see FIG. 12), so that the flange 3 can be brought into close contact with the periphery of a lateral pipe opening in the main pipe. The outside diameter of the flange 3 is set to be larger than the inside diameter of a lateral pipe 31 to be described later (see FIG. 12), and the thermosetting resin with which the flange 3 is impregnated is cured in advance, thereby holding the shape of the flange 3.

The flange 3 may also be formed using a thermoplastic resin, such as polyvinyl chloride, instead of a thermosetting resin. In this case, the flange 3 and the tubular resin-absorbing material 2 are joined using an adhesive or the like.

A tubular removable end 6 capable of being removed is mounted on the other end of the tubular resin-absorbing material 2. The removable end 6 comprises a material similar to that of the plastic film 4, and is connected at the other end to a coupler 7.

Figure 2:
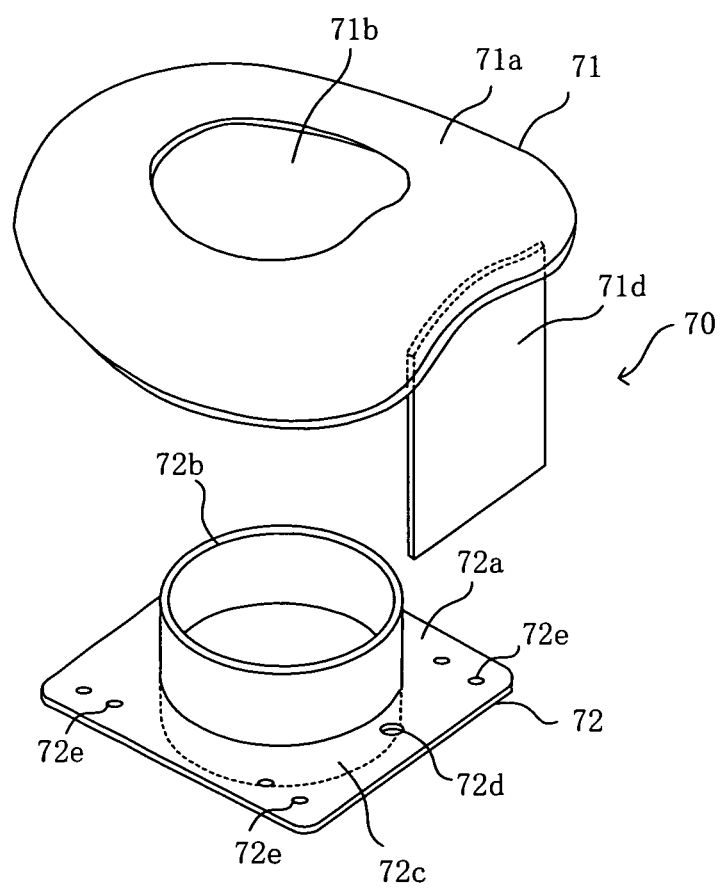
FIG. 2 is a perspective view showing a head collar disassembled into an upper head collar and a lower head collar.

FIG. 2 is a perspective view showing a disassembled head collar 70 that is hermetically mounted to a pressure bag to be described later. The head collar 70 comprises an upper head collar 71 made of metal and a lower head collar 72 made of metal. The upper head collar 71 has a curved section 71a curving at the same curvature as the inner wall of the main pipe 30 and the flange 3 of the lateral pipe lining material 1. An opening section 71b is formed in the center of this curved section 71a. The curved section 71a may be exchanged so as to match the diameter of the main pipe 30.

Figure 10:
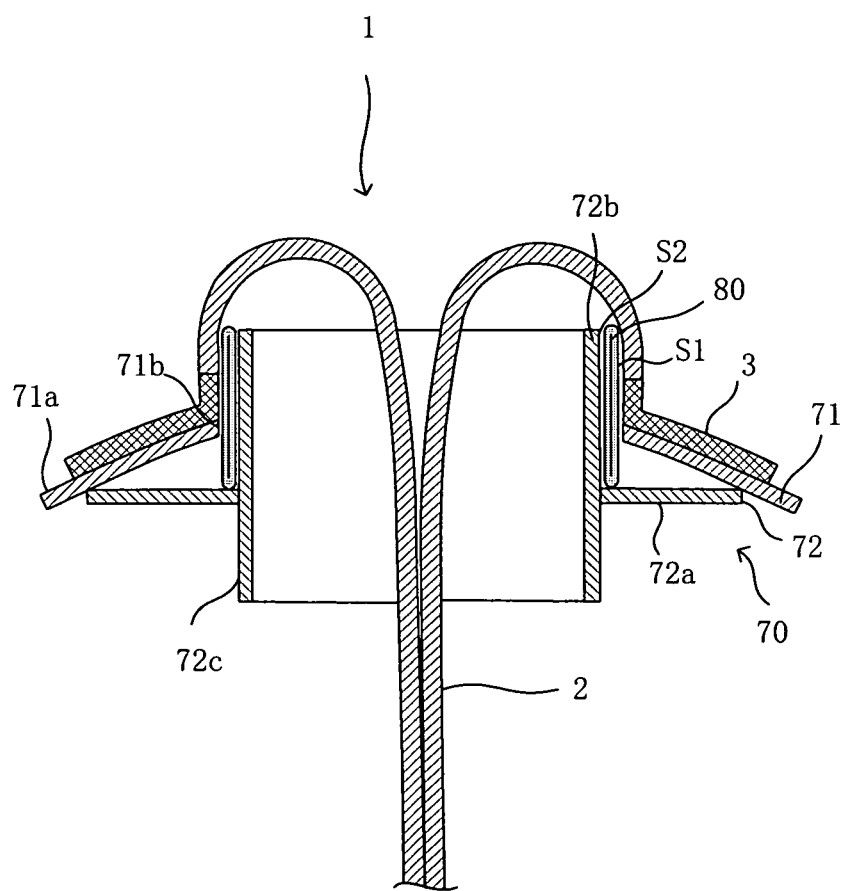
FIG. 10 is a sectional view of a lateral pipe lining material when set on a head collar on which an expanding member has been installed.

The curved section 71a is of sufficient area to allow the flange 3 of the lateral pipe lining material 1 to be reliably pressed against the periphery of the lateral pipe opening of the main pipe, and the diameter of the opening section 71b is substantially equal to the inside diameter of the flange 3. As shown in FIG. 10, the flange 3 of the lateral pipe lining material 1 is placed on the curved section 71a of the upper head collar 71, and the lateral pipe lining material 1 can be positioned on the head collar 70 so that the not-yet-everted tubular resin-absorbing material 2 except for the flange 3 passes through a cylindrical section of the lower head collar 72 to extend downward. A mounting plate 71d is secured in place to the curved section 71a for mounting the head collar 70 to a work robot to be described later.

The lower head collar 72 comprises a rectangular flat pedestal 72a and a hollow cylindrical section that passes through the center of the pedestal 72a and is secured in place thereto. The portion of the cylindrical section extending above the pedestal 72a in the drawing is an upper cylindrical section 72b, and the portion extending below is a lower cylindrical section 72c. A hole 72d is formed in the pedestal 72a to allow a hose to be passed therethrough so that a pressurized fluid, such as compressed air, is fed to an expanding member to be described later. A plurality of screw holes 72e are formed in the pedestal 72a.

Figure 3:
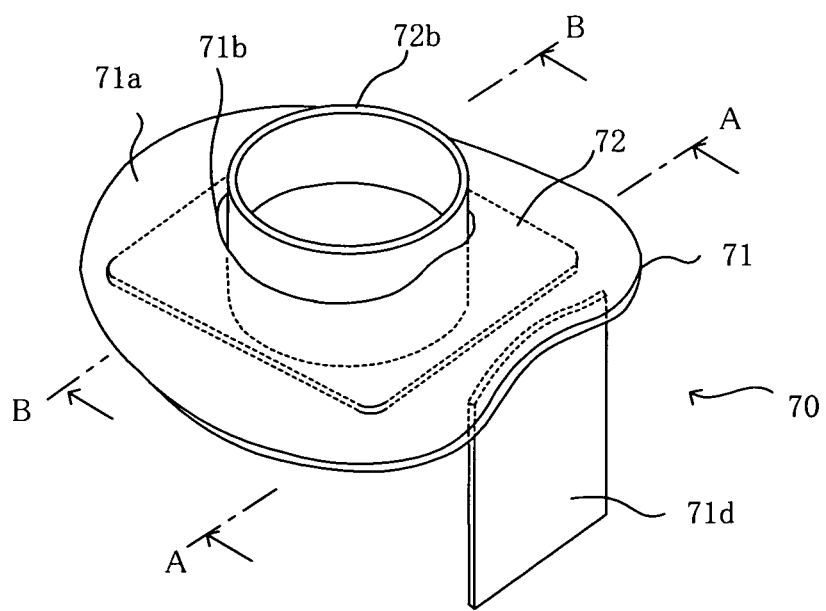
FIG. 3 is a perspective view showing an upper head collar joined with a lower head collar.
Figure 4:
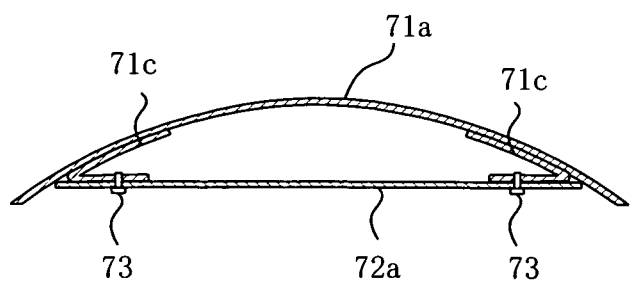
FIG. 4 is a vertical sectional view of the head collar of FIG. 3 taken along line A-A.

The outside diameter of the upper cylindrical section 72b is less than the diameter of the opening section 71b of the upper head collar 71. The upper cylindrical section 72b can be passed through the opening section 71b to join the lower head collar 72 to the upper head collar 71 as shown in FIG. 3. A fixed angle bracket 71c with screw holes is mounted to the inside of the upper head collar 71 as shown in FIG. 4. The pedestal 72a of the lower head collar 72 and the fixed angle bracket 71c are brought into contact, and screwed together using screws 73. This allows the upper head collar 71 to be secured in place to and integrated with the lower head collar 72 to constitute the head collar 70.

Figure 5:
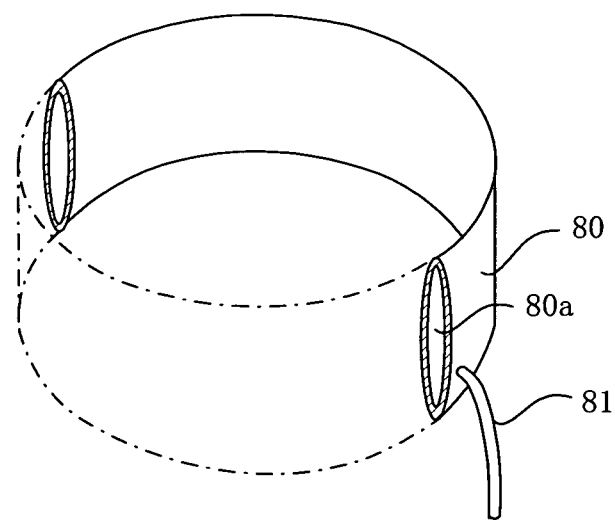
FIG. 5 is a partially sectional perspective view showing an appearance of an expanding member.

FIG. 5 shows an annular tube forming an expanding member 80. The expanding member 80 comprises a long, annular, elastic material such as rubber, vinyl, or silicon, and is formed into an annular shape as shown in FIG. 5 by hermetically welding or bonding both ends.

A flexible hose 81 is hermetically mounted on the expanding member 80 and is used to feed thereto a pressurized fluid such as a compressed gas (for example, compressed air) or a liquid under pressure. When a fluid is fed to the interior 80a of the expanding member 80 through the hose 81, the expanding member 80 expands in a round annular shape. The dimensions of the expanding member 80 are set so that upon expanding to a round annular shape, the outside diameter thereof is substantially equal to the diameter of the opening section 71b of the upper head collar 71, the inside diameter thereof is substantially equal to the outside diameter of the upper cylindrical section 72b of the lower head collar 72, and the height thereof is substantially equal to the height of the upper cylindrical section 72b.

Figure 6:
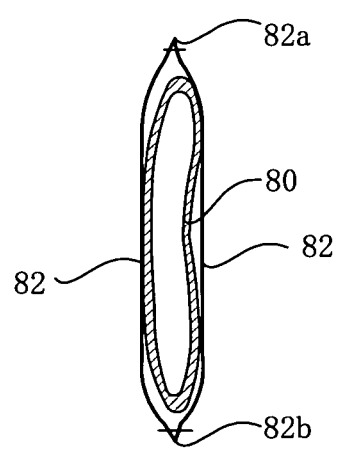
FIG. 6 is a sectional view of an expanding member when protected by a protective cover.

Because a fluid is fed to the expanding member 80 under pressure, there is a risk that the material of the expanding member will burst. Therefore, as shown in FIG. 6, the entire expanding member 80 is covered by a protective cover 82 made of a fiber, such as cashmere, silk, Nylon, or rayon, or a stretch-resistant material such as silicon, polyethylene, or polyurethane. The expanding member 80 is covered, for example, by sewing or bonding an upper portion 82a and a lower portion 82b of the two-ply protective cover 82 in the form of a sheet. This protective cover 82 protects the expanding member 80 so that the entire expanding member 80 does not expand too far. The expanding member 80 is shown without the protective cover 82 to avoid overcomplicating the following drawings.

Figure 7:
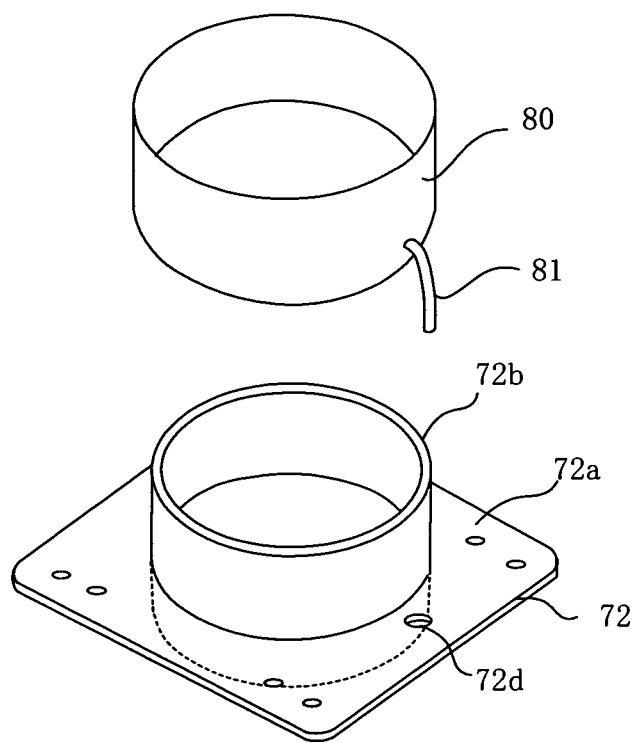
FIG. 7 is a perspective view showing an expanding member installed on a lower head collar.
Figure 8A:
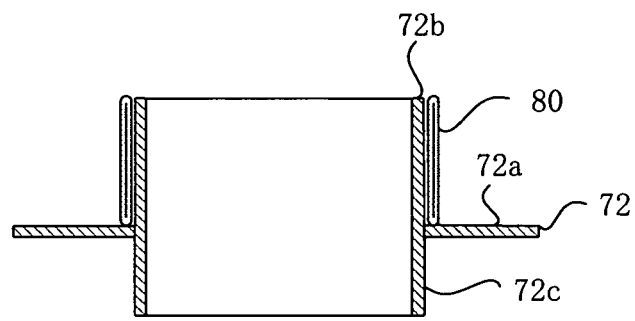
FIG. 8a is a sectional view of an expanding member when installed on a lower head collar.
Figure 8B:
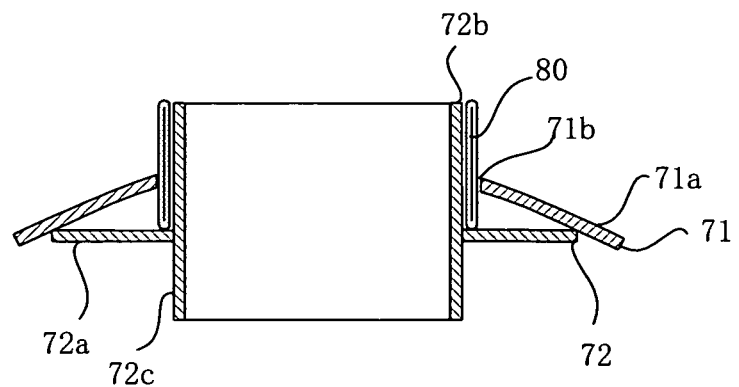
FIG. 8b is a sectional view of an expanding member taken along line B-B of FIG. 3 when it is set on a head collar.
Figure 9:
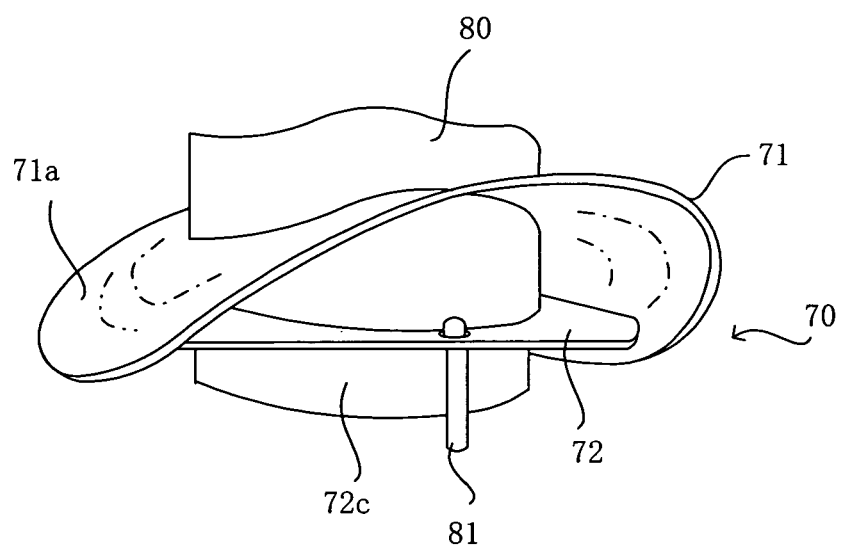
FIG. 9 is a perspective view showing an appearance of an expanding member when it is installed on a head collar.

The expanding member 80 is mounted on the head collar 70 as shown in FIGS. 7 to 9.

First, as shown in FIG. 7, the expanding member 80 has a round annular shape retained in a state where no pressurized fluid is fed to the expanding member 80. The expanding member 80 is put on the upper cylindrical section 72b of the lower head collar 72, and the hose 81 is passed through the hole 72d formed in the pedestal 72a. With no pressurized fluid fed, the inside diameter of the expanding member 80 is slightly larger than the outside diameter of the upper cylindrical section 72b. Therefore, when the expanding member 80 is put on the upper cylindrical section 72b, it sits on the pedestal 72a of the lower head collar 72 as shown in FIG. 8a.

Next, the expanding member 80 is passed through the opening section 71b of the upper head collar 71, and the upper head collar 71 and the lower head collar 72 are joined as shown in FIG. 4 using the screws 73. Because the outside diameter of the expanding member 80 is slightly smaller than the diameter of the opening section 71b of the upper head collar 71 when no pressurized fluid is fed thereto, the expanding member 80, as shown in FIG. 8b, fits into a gap between the opening section 71b of the upper head collar 71 and the upper cylindrical section 72b of the lower head collar 72.

FIG. 9 perspectively shows the expanding member 80 installed on the head collar 70 when viewed from below.

After the expanding member 80 has been installed on the head collar 70, the flange 3 of the lateral pipe lining material 1 is laid over the curved section 71a of the upper head collar 71 as shown in FIG. 10, and the non-everted portion of the tubular resin-absorbing material 2 is inserted into the cylindrical sections 72b and 72c of the lower head collar 72 to position the lateral pipe lining material 1 on the head collar 70. During the positioning of the lateral pipe lining material 1, the cylindrical section 72b of the lower head collar 72 on which the expanding member 80 is mounted is located at an area near the flange of the lateral pipe lining material.

Figure 11:
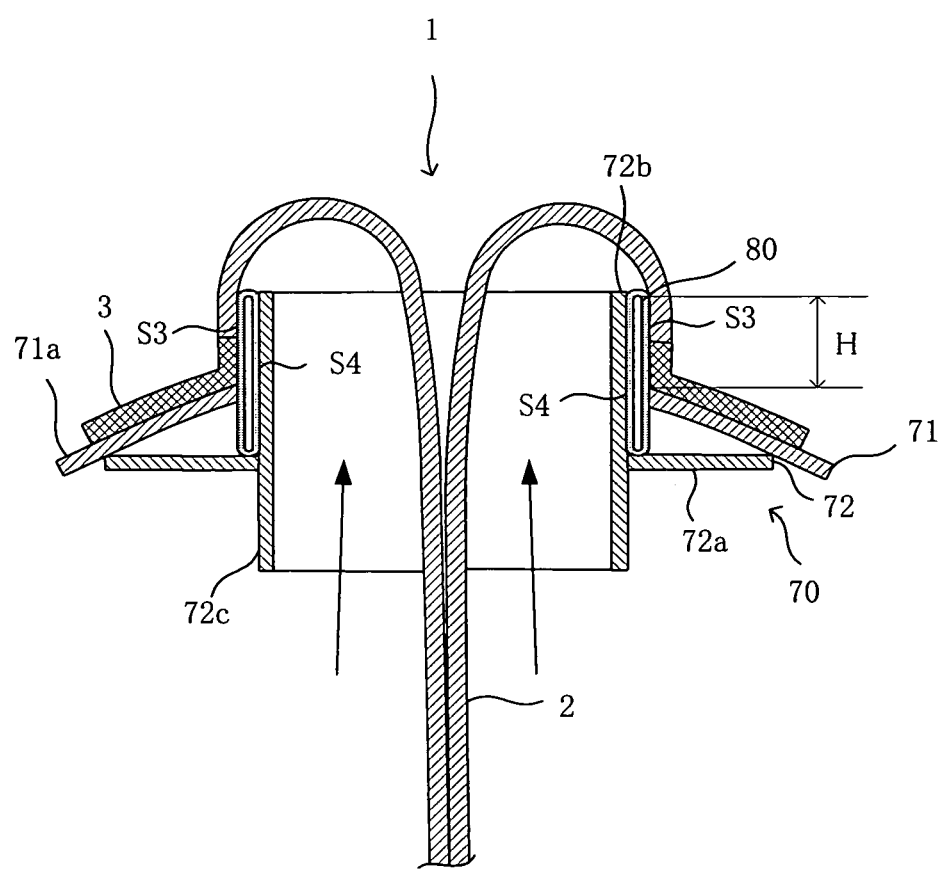
FIG. 11 is a sectional view of an expanding member when it is expanded while in the state shown in FIG. 10.

When no pressurized fluid is fed to the expanding member 80, a gap S1 is formed between the inner circumferential surface near the flange 3 of the lateral pipe lining material 1 and the outer circumferential surface of the expanding member 80, and a gap S2 is formed between the outer circumferential surface of the upper cylindrical section 72b of the lower head collar 72 and the inner circumferential surface of the expanding member 80. Therefore, the head collar 70 and the lateral pipe lining material 1 are not hermetically connected. When a pressurized fluid is fed to the expanding member 80 through the hose 81, however, the expanding member 80 expands to eliminate the gaps S1 and S2 as shown in FIG. 11. The pressurized fluid is fed to the expanding member 80 until a hermetic seal is achieved between the inner circumferential surface S3 near the flange 3 of the lateral pipe lining material 1 and the outer circumferential surface of the expanding member 80, and until a hermetic seal is achieved between the outer circumferential surface S4 of the upper cylindrical section 72b and the inner circumferential surface of the expanding member 80.

Figure 12:
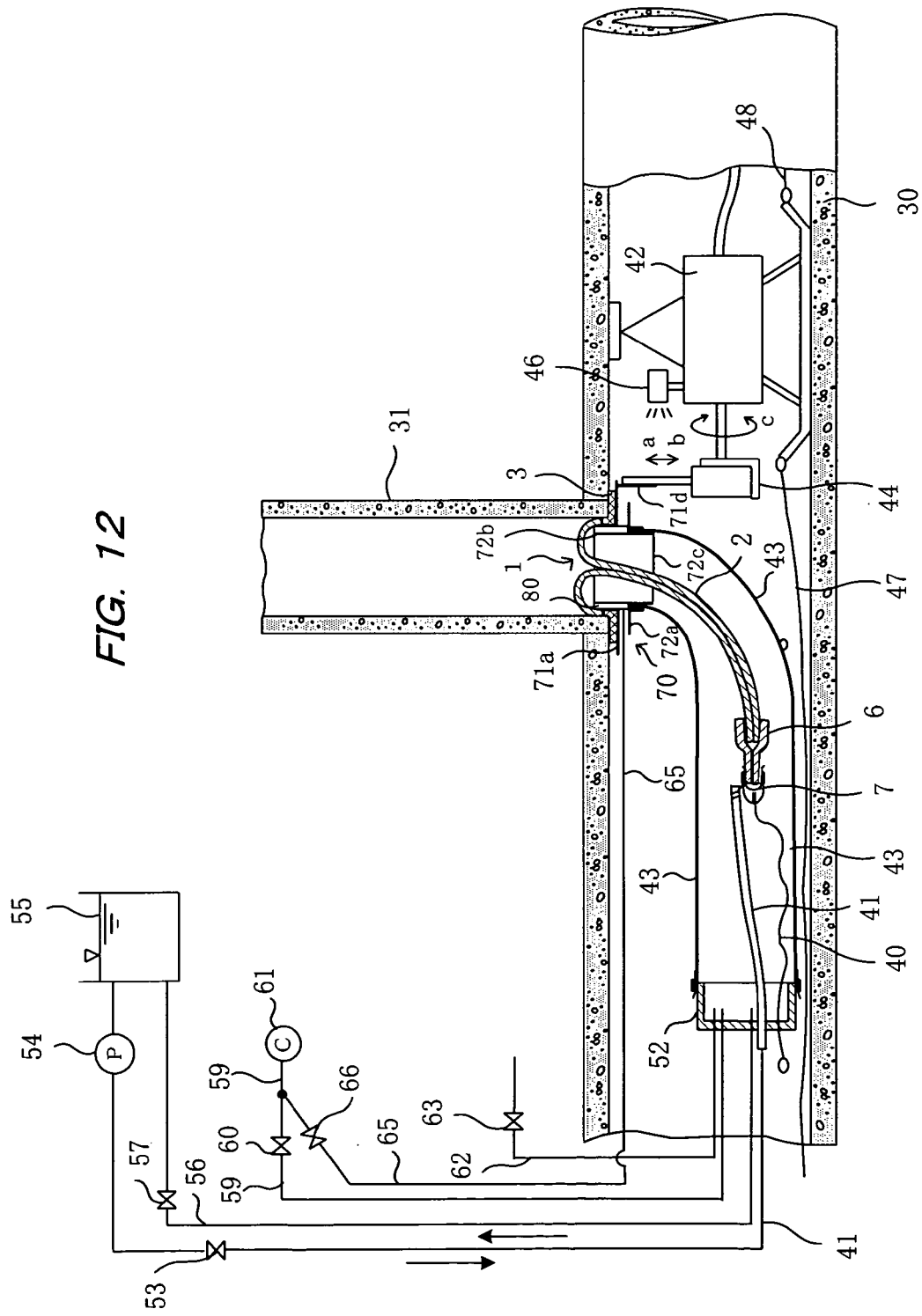
FIG. 12 is an illustrative view showing how to line a lateral pipe with a lateral pipe lining material.
Figure 13:
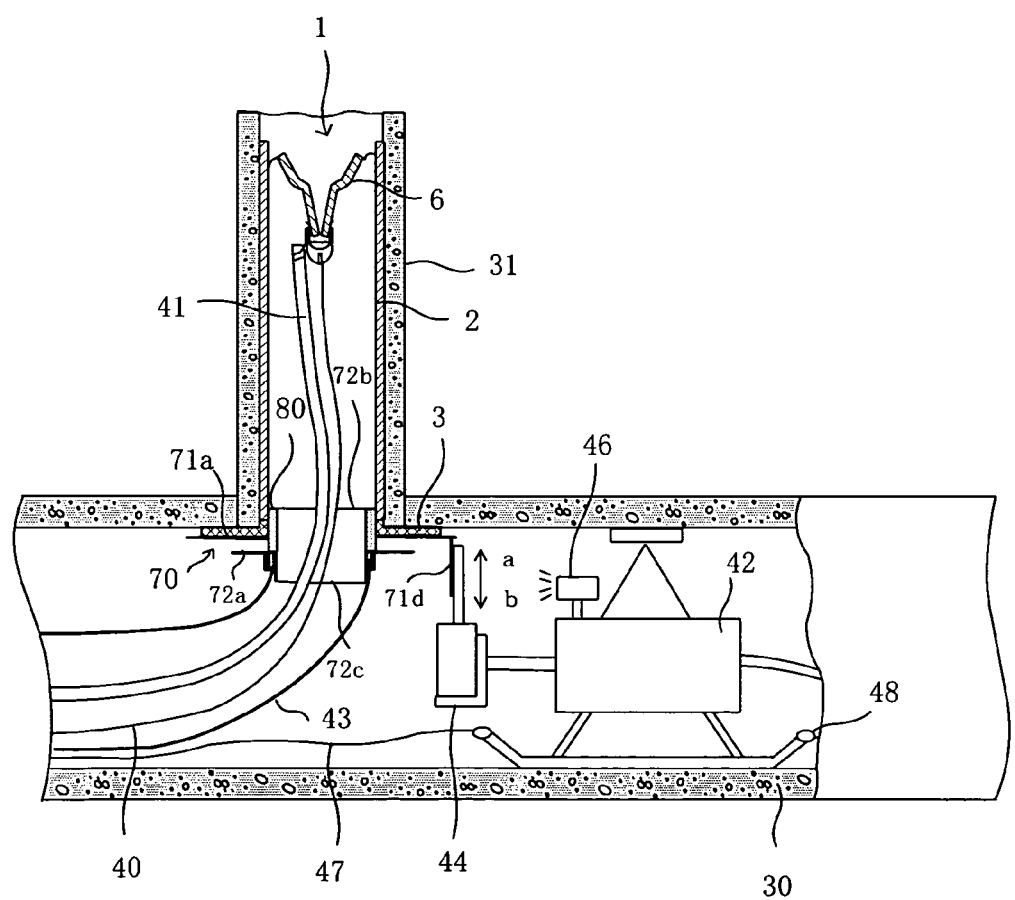
FIG. 13 is an illustrative view showing how to line a lateral pipe with a lateral pipe lining material.

FIGS. 12 and 13 show how a lateral pipe is lined using the lateral pipe lining material 1 shown in FIG. 1.

The lateral pipe lining material 1 is positioned on the head collar 70 with the expanding member 80 disposed therebetween, as described earlier. The flange 3 of the lateral pipe lining material 1 comes into close contact with the curved section 71a of the upper head collar 71, and the non-everted portion of the material passes through the head collar 70 and is stored inside a pressure bag 43. The cylindrical section 72c of the head collar 70 is inserted into one end of the pressure bag 43 and is hermetically mounted thereon. The open end of the pressure bag 43 opposite the head collar 70 is hermetically closed by a cap 52.

A TV camera 46 for monitoring processes is arranged in the upper part of a work robot 42. Tow ropes 47, 48 extending above ground are provided in front and in back of the work robot 42. The tow ropes 47, 48 are pulled to move the pressure bag 43 and both the head collar 70 and the lateral pipe lining material 1 mounted thereon until the center of the cylindrical sections 72b and 72c of the head collar 70 substantially coincide with the axial center of the lateral pipe 31.

The work robot 42 is configured so that its head 44 moves back and forth in directions a and b (up and down) in FIG. 12, and rotates (rolls) around on the pipe axis as shown by the arrow c. Since the head collar 70 is mounted on a distal end part of the head 44 of the work robot 42 using the mounting plate 71d, the head collar 70 and the lateral pipe lining material 1 disposed thereon move in the same manner in conjunction with movement of the head 44 in the directions a, b, and c. Moving the head 44 up and down or rolling the head allows the flange 3 of the lateral pipe lining material 1 to be brought into close contact with the periphery of the lateral pipe opening of the main pipe 30. FIG. 12 shows this state.

A tow rope 40 and a hot water hose 41 that are connected to the cap 52 are joined to the coupler 7 mounted on the removable end 6 of the lateral pipe lining material 1. The hot water hose 41 is passed through the cap 52 outside the pressure bag 43 and led to a valve 53. Hot water (heating medium) is fed to the hot water hose 41 by a hot water pump 54 from a hot water tank 55 heated by a heat source (not shown). Hot water inside the pressure bag 43 is returned to the hot water tank 55 through a drain hose 56 and a valve 57.

A hose 59 is connected at one end to the cap 52 and at the other end via a valve 60 to a compressor or a pump (pressurized fluid source) 61 above ground. The hose 59 branches midway to connect via a valve 66 to a hose 65 that is connected to the hose 81 of the expanding member 80 (not shown in FIG. 12).

Adjusting the valve 66 allows a pressurized fluid such as compressed air or a liquid under pressure to be fed at a predetermined pressure from the pressurized fluid source 61 to the expanding member 80. When the pressurized fluid is fed, the expanding member 80 expands so that the outer circumferential surface of the expanding member 80 comes into close contact with the inner circumferential surface S3 of the flange 3, and the inner circumferential surface of the expanding member 80 comes into close contact with the outer circumferential surface S4 of the cylindrical section of the head collar as shown in FIG. 11. Expanding the expanding member 80 in this way allows the lateral pipe lining material 1 to be hermetically connected to the head collar 70. Since the head collar 70 is hermetically connected to the pressure bag 43, a hermetically sealed space is formed inside the pressure bag 43.

After the expanding member 80 has been expanded as described above, a pressurized fluid is fed into the pressure bag 43 through the hose 59 and the valve 60 from the pressurized fluid source 61. The pressurized fluid is prevented from leaking from the area where the lateral pipe lining material 1 is connected to the head collar 70 that is hermetically connected to the pressure bag 43. This allows the lateral pipe lining material 1 to be reliably everted by the eversion pressure of the pressurized fluid shown by the arrow in FIG. 11 and successively inserted upward into the lateral pipe 31.

When everting and inserting the lateral pipe lining material 1 into the lateral pipe 31 is completed, as shown in FIG. 13, the lateral pipe lining material 1 is pressed against the inner circumferential surface of the lateral pipe 31. Hot water is then fed from the end of the hot water hose 41 to fill inside the hermetically sealed space. The pressurized fluid inside the hermetically sealed space is released through a drain hose 62 into the atmosphere, and the hot water heats and cures the thermosetting resin impregnated in the tubular resin-absorbing material 2 of the lateral pipe lining material 1.

When the resin impregnated in the tubular resin-absorbing material 2 is cured, the hot water is drained from the hermetically sealed space through the drain hose 56 and returned to the hot water tank 55. The valve 66 is then closed to cut off feeding the pressurized fluid to the expanding member 80, thus lowering the pressure to shrink the expanding member 80.

Next, the head 44 of the work robot 42 is lowered in arrow direction b in the drawing, and the head collar 70 and the expanding member 80 are separated from the lateral pipe lining material 1. The tow rope 40 is pulled to the left in FIG. 13. This causes the removable end 6, the hot water hose 41, and the like to be pulled in the same direction for removal from the lateral pipe lining material 1.

The work robot 42, the pressure bag 43, the head collar 70, the expanding member 80, and the like are removed from inside the main pipe 30, leaving the inner circumferential surface of the lateral pipe 31 lined with the tubular resin-absorbing material 2.

As described earlier, when the expanding member 80 is expanded, the outer circumferential surface of the expanding member comes into close contact with the inner circumferential surface of the flange of the lateral pipe lining material, and the inner circumferential surface of the expanding member comes into close contact with the outer circumferential surface of the cylindrical section of the head collar 70. As a result, the lateral pipe lining material 1 and the head collar 70 are hermetically connected, and the pressurized fluid cannot leak from the area where the lateral pipe lining material 1 is connected to the head collar 70. Therefore, the lateral pipe lining material 1 is reliably everted and inserted into the lateral pipe 31.

The expanding member 80, as shown in FIGS. 10 and 11, is an expanding member that is wide in the direction in which the cylindrical section of the head collar extends (corresponding to the height H in FIG. 11). Therefore, when expanded, the expanding member 80 tightly contacts with all of the outer circumferential surface S4 of the cylindrical section projecting from the curved section of the head collar, and tightly contacts with a wide range of the inner circumferential surface S3 near the flange 3 of the lateral pipe lining material 1. As a result, a large contact area is created, increasing the airtightness of the area where the lateral pipe lining material 1 is connected to the head collar 70.

Figure 14:
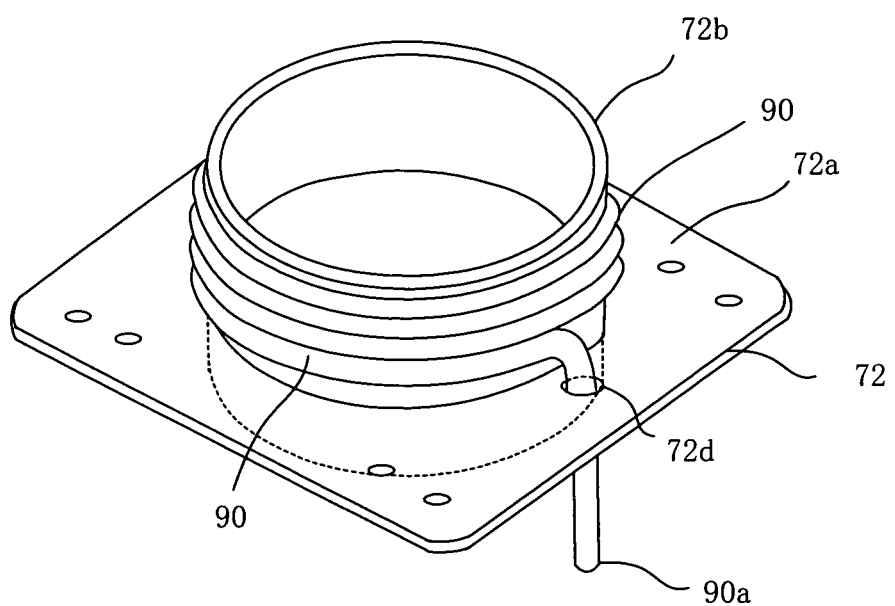
FIG. 14 is a perspective view showing another embodiment of an expanding member installed on a head collar.
Figure 15:
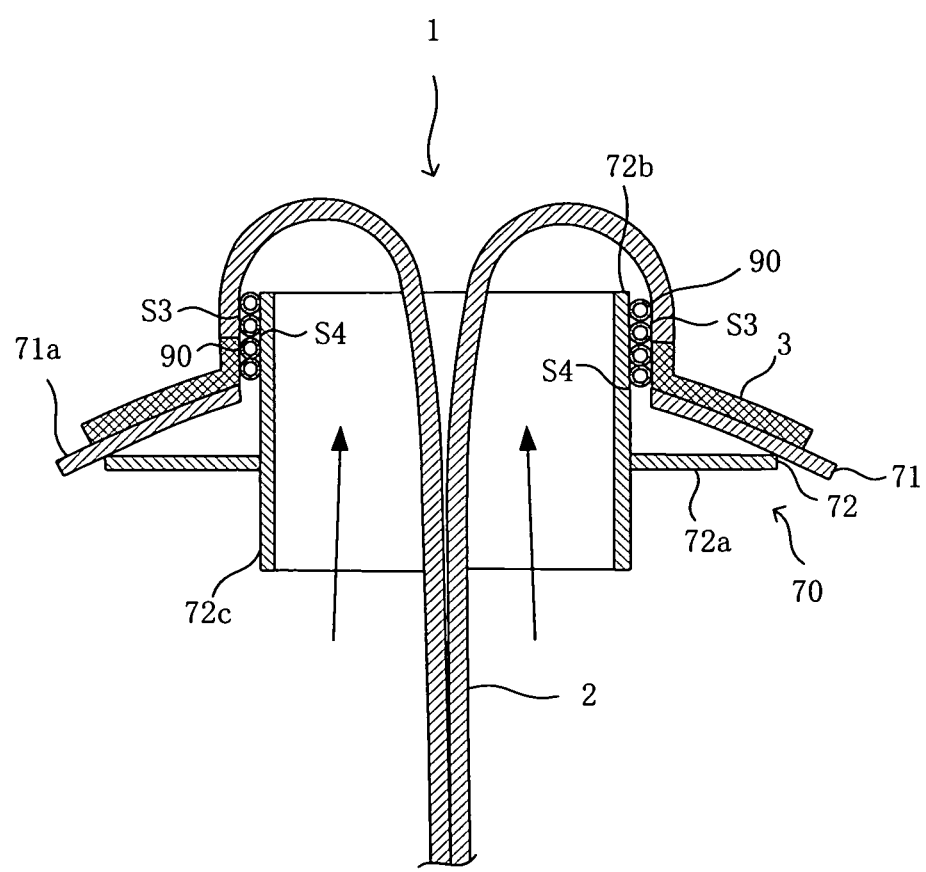
FIG. 15 is a sectional view showing the expanding member of FIG. 14.

FIGS. 14 and 15 show another embodiment of an expanding member. The expanding member of this embodiment is composed of a long thin tube 90 that is circular in cross section. The tube 90 is made of the same material as the expanding member 80, and wound many times in close contact with each other around the cylindrical section 72b of the lower head collar 72. One end 90a of the tube 90 is passed through the hole 72d of the pedestal 72a, and a pressurized fluid can be fed from this end 90a. The other end of the tube 90 (not shown) is closed. When no pressurized fluid is fed to the tube 90, a gap is formed between the inner circumferential surface near the flange 3 of the lateral pipe lining material 1 and the tube 90, and between the outer circumferential surface of the cylindrical section of the head collar 72b and the tube 90. When pressurized fluid is fed to the tube 90, however, the tube 90 expands in cross section and comes into close contact with the inner circumferential surface S3 near the flange 3 and with the outer circumferential surface S4 of the cylindrical section 72b as shown in FIG. 15. The tube 90 expands circularly in cross section and contacts with the surfaces S3 and S4 linearly. Therefore, the tube 90 has less of a close-contact effect than the wide expanding member 80, but wrapping the tube 90 many times can increase the close-contact effect, providing a comparable effect to the expanding member 80. The tube may preferably be wound in multiple layers (many times) around all of the cylindrical section projecting from the curved section of the head collar in order to increase the close-contact effect.

The head collar is described as comprising an upper head collar having a curved section and a lower head collar formed with a cylindrical section, and the upper head collar and the lower head collar are joined. However, the head collar may be a unified head collar that does not separate.

What is claimed is:

1. A lateral pipe lining method in which a flange formed on one end of a lateral pipe lining material composed of a flexible tubular resin-absorbing material impregnated with a curable resin is brought into close contact with the periphery of a lateral pipe opening of a main pipe, and eversion pressure is applied to the lateral pipe lining material to evert and insert the lateral pipe lining material into a lateral pipe to line the inner circumferential wall thereof, comprising:

preparing a head collar having a curved section and a cylindrical section projecting from the curved section and having a smaller outside diameter than the inside diameter of the flange of the lateral pipe lining material;

mounting to the outer circumferential surface of the cylindrical section of the head collar an expanding member capable of expanding by feeding a pressurized fluid thereto, the lateral pipe lining material being installed on the head collar so that the cylindrical section of the head collar to which the expanding member is mounted is located within the flange of the lateral pipe lining material;

expanding the expanding member so that the outer circumferential surface of the expanding member comes into close contact with the inner circumferential surface near the flange and the inner circumferential surface of the expanding member comes into close contact with the outer circumferential surface of the cylindrical section of the head collar; and everting and inserting the lateral pipe lining material into the lateral pipe with the expanding member expanded to line the lateral pipe with the lateral pipe lining material.

2. A lateral pipe lining method according to claim 1, wherein the expanding member is wide in the direction in which the cylindrical section of the head collar extends, and large enough to tightly contact with substantially all of the cylindrical section projecting from the curved section of the head collar when the expanding member is expanded.

3. A lateral pipe lining method according to claim 1, wherein the expanding member is covered in whole by a protective cover.

4. A lateral pipe lining method according to claim 1, wherein the expanding member is a thin and long tube that is circular in cross section and is wound in multiple layers around the cylindrical section of the head collar.

5. A lateral pipe lining method according to claim 4, wherein the tube is wound around all of the cylindrical section projecting from the curved section of the head collar.

6. A lateral pipe lining method according to claim 1, wherein a pressurized fluid for expanding the expanding member is fed from the same pressurized fluid source as the pressurized fluid for everting the lateral pipe lining material.

7. A lateral pipe lining method according to claim 1, wherein the pressurized fluid is a compressed gas or a liquid under pressure.

8. A lateral pipe lining method according to claim 1, wherein the head collar comprises an upper head collar having a curved section and a lower head collar formed with a cylindrical section, and the upper head collar and the lower head collar are joined so that the cylindrical section of the lower head collar projects from the curved section of the upper head collar.

9. A lateral pipe lining apparatus in which a flange formed on one end of a lateral pipe lining material composed of a flexible tubular resin-absorbing material impregnated with a curable resin is brought into close contact with the periphery of a lateral pipe opening of a main pipe, and eversion pressure is applied to the lateral pipe lining material to evert and insert the lateral pipe lining material into a lateral pipe to line the inner circumferential wall thereof, the apparatus comprising:

a head collar having a curved section and a cylindrical section projecting from the curved section so that the outside diameter thereof is less than the inside diameter of the flange of the lateral pipe lining material;

an expanding member mounted to the outer circumferential surface of the cylindrical section of the head collar, the expanding member being capable of expanding by feeding a pressurized fluid thereto, the lateral pipe lining material being installed on the head collar so that the cylindrical section of the head collar to which the expanding member is mounted is located within the flange of the lateral pipe lining material;

a pressure bag to which the head collar is hermetically mounted and which stores a non-everted portion of the lateral pipe lining material; and a work robot for guiding the pressure bag so that the flange of the lateral pipe lining material is brought into close contact with the periphery of the lateral pipe opening of the main pipe, wherein the expanding member is caused to expand so that the outer circumferential surface of the expanding member comes into close contact with the inner circumferential surface near the flange, and the inner circumferential surface of the expanding member comes into close contact with the outer circumferential surface of the cylindrical section of the head collar, and the lateral pipe lining material within the pressure bag is everted and inserted into the lateral pipe with the expanding member expanded to line the lateral pipe with the lateral pipe lining material.

10. A lateral pipe lining apparatus according to claim 9, wherein the expanding member is wide in the direction in which the cylindrical section of the head collar extends, and large enough to tightly contact with substantially all of the cylindrical section projecting from the curved section of the head collar when the expanding member is expanded.

11. A lateral pipe lining apparatus according to claim 9, wherein the expanding member is covered in whole by a protective cover.

12. A lateral pipe lining apparatus according to claim 9, wherein the expanding member is a thin and long tube that is circular in cross section and is wound in multiple layers around the cylindrical section of the head collar.

13. A lateral pipe lining apparatus according to claim 12, wherein the tube is wound around all of the cylindrical section projecting from the curved section of the head collar.

14. A lateral pipe lining apparatus according to any one of claim 9, wherein a pressurized fluid for expanding the expanding member is fed from the same pressurized fluid source as the pressurized fluid for everting the lateral pipe lining material.

15. A lateral pipe lining apparatus according to claim 9, wherein the pressurized fluid is compressed air or a liquid under pressure.

16. A lateral pipe lining apparatus according to claim 9, wherein the head collar comprises an upper head collar having a curved section and a lower head collar formed with a cylindrical section, and the upper head collar and the lower head collar are joined so that the cylindrical section of the lower head collar projects from the curved section of the upper head collar.

* * * * *